United States Patent
Ro et al.

(10) Patent No.: US 9,161,247 B2
(45) Date of Patent: Oct. 13, 2015

(54) METHOD AND APPARATUS FOR USING CHANNEL OUTPUT FEEDBACK IN MULTI USER WIRELESS SYSTEMS AND HYBRID-ARQ

(71) Applicants: Samsung Electronics Co., Ltd., Suwon-si, Gyeonggi-do (KR); Purdue Research Foundation, West Lafayette, IN (US)

(72) Inventors: Sangmin Ro, Seoul (KR); Mayur Agrawal, West Lafayette, IN (US); David J. Love, West Lafayette, IN (US); Junil Choi, West Lafayette, IN (US); Juho Lee, Suwon-si (KR)

(73) Assignees: Samsung Electronics Co., Ltd., Suwon-si (KR); Purdue Research Foundation, West Lafayette ( * ) Notice: Subject to any disclaimer, the term of this patent is extended or adjusted under 35 U.S.C. 154(b) by 122 days.

(21) Appl. No.: 14/058,737

(22) Filed: Oct. 21, 2013

(65) Prior Publication Data

US 2014/0112272 A1 Apr. 24, 2014

Related U.S. Application Data

(60) Provisional application No. 61/716,178, filed on Oct. 19, 2012.

(51) Int. Cl.
*H04W 24/02* (2009.01)
*H04L 5/00* (2006.01)
*H04L 1/00* (2006.01)
*H04L 1/16* (2006.01)
*H04L 1/18* (2006.01)

(52) U.S. Cl.
CPC ............. *H04W 24/02* (2013.01); *H04L 1/0026* (2013.01); *H04L 1/1671* (2013.01); *H04L 1/1893* (2013.01); *H04L 5/0051* (2013.01)

(58) Field of Classification Search
CPC ............................ H04W 24/02; H04L 5/0051
See application file for complete search history.

(56) References Cited

U.S. PATENT DOCUMENTS

| | | | | |
|---|---|---|---|---|
| 2011/0205963 | A1* | 8/2011 | Tang et al. | 370/328 |
| 2012/0176887 | A1* | 7/2012 | Mcbeath et al. | 370/216 |
| 2013/0215951 | A1* | 8/2013 | Nuzman | 375/227 |
| 2014/0003274 | A1* | 1/2014 | Clerckx et al. | 370/252 |
| 2015/0049688 | A1* | 2/2015 | Yamazaki | 370/329 |

* cited by examiner

*Primary Examiner* — Albert T Chou
(74) *Attorney, Agent, or Firm* — Jefferson IP Law, LLP

(57) ABSTRACT

A method and apparatus for transmitting and receiving a signal using a channel output feedback in a wireless communication system and Hybrid-Automatic Repeat Request (ARQ) are provided. The method and apparatus include a transmitter configured to transmit to a base station and a first packet on a precoder received from the base station. A receiver configured to receive, from the base station, a Channel Output Feedback (COF) of the transmitted first packet and information for transmitting a second packet. A controller configured to prepare a variant of the second packet using the COF and the received information for transmitting the second packet, and to control to transmit the prepared variant to the base station.

20 Claims, 10 Drawing Sheets

METHOD AND APPARATUS FOR USING CHANNEL OUTPUT FEEDBACK IN MULTI USER WIRELESS SYSTEMS AND HYBRID-ARQ

CROSS-REFERENCE TO RELATED APPLICATION(S)

This application claims the benefit under 35 U.S.C. §119 (e) of a U.S. Provisional application filed on Oct. 19, 2012 in the U.S. Patent and Trademark Office and assigned Ser. No. 61/716,178, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) PURDUE RESEARCH FOUNDATION.

TECHNICAL FIELD

The present disclosure relates to a signal transmission/reception method and apparatus. More particularly, the present disclosure relates to a method and apparatus for transmitting and receiving a signal using a channel output feedback in a wireless communication system and Hybrid-Automatic Repeat Request (ARQ).

BACKGROUND

The use of Channel Output Feedback (COF) in conjunction with Channel State Information (CSI) feedback has generated a lot of attention in the research community (See, References [1, 3, 4]). This kind of feedback set up is generally referred to as Shannon feedback. It has been shown that the use of Shannon feedback has the potential to increase the capacity of a network (See, Reference [1]). However most of the analysis has been geared towards degrees of freedom arguments in a high Signal-to-Noise Ratio (SNR) regime.

REFERENCES

Reference [1] C. S. Vaze, and M. K. Varanasi, \Can feedback increase the degrees of freedom of a wireless network with delayed CSIT?", 49th Annual Allerton Conference on Communication, Control, and Computing (Allerton), pp. 76-83, September 2011.

Reference [2] S. W. Peters, and R. W. Heath, Jr., \Interference alignment via alternating minimization", IEEE International Conference on Acoustics, Speech and Signal Processing (ICASSP), pp. 19-24, April 2009.

Reference [3] H. Maleki, S. A. Jafar, S. Shamai, \Retrospective Interference Alignment over Interference Networks", IEEE Journal of Selected Topics in Signal Processing, Special issue on Signal Processing In Heterogeneous Networks For Future Broadband Wireless Systems, Accepted. To appear in March 2012.

Reference [4] R. Tandon, S. Mohajer, H. V. Poor, S. Shamai, \On Interference Networks with Feedback and Delayed CSI", Available at arXiv:1109.5373v1.

Reference [5] J. C. Gower, and G. B. Dijkterhuis, Procrustes Problems, Oxford University Press, 2004.

Reference [6] M. A. Koshat, and D. F. Swayne, \A weighted Procrustes criterion", Psychometrika, pp. 229-239, 1991.

Reference [7] S. Gollakota, S. D. Perli, and D. Katabi, \Interference alignment and cancellation", SIGCOMM, pp. 159-170, October 2009.

Each of references [1]-[7] are hereby incorporated by reference in their entity.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving a signal using a channel output feedback in a wireless communication system and Hybrid-Automatic Repeat Request (ARQ) that substantially obviate one or more problems due to limitations and disadvantages of the related art.

Another aspect of the present disclosure is to provide a method and apparatus for transmitting and receiving a signal using a channel output feedback in a wireless communication system and Hybrid-ARQ, which are capable of minimizing the sum of interference over all the users during the transmission in the wireless communication system.

Another aspect of the present disclosure is to provide a method and apparatus for transmitting and receiving a signal using a channel output feedback in a wireless communication system and Hybrid-ARQ, which are capable of providing, to a terminal, information for generating a transmission signal to minimize an interference.

Additional advantages, aspects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these aspects and other advantages and in accordance with the purpose of the disclosure, as embodied and broadly described herein, there is provided a terminal for transmitting a signal using a channel output feedback. The terminal includes a transmitter configured to transmit, to a base station, a first packet on a precoder received from the base station. The terminal also includes a receiver configured to receive, from the base station, a Channel Output Feedback (COF) of the transmitted first packet and information for transmitting a second packet, wherein the information for transmitting the second packet is determined based on a channel output of the transmitted first packet. The terminal further includes a controller configured to prepare a variant of the second packet using the COF and the received information for transmitting the second packet, and to control to transmit the prepared variant to the base station.

In accordance with another aspect of the present disclosure, a method for transmitting a signal using a channel output feedback in a terminal is provided. Information for a precoder is received from the base station. A first packet on the received precoder is transmitted to the base station. A COF of the transmitted first packet is received from the base station. Information for transmitting a second packet is received from the base station, wherein the information for transmitting the second packet is determined based on a channel output of the transmitted first packet. A variant of the second packet is prepared using the COF and the received information for transmitting the second packet. The prepared variant is transmitted to the base station.

In accordance with another aspect of the present disclosure, a base station for receiving a signal using a channel output feedback is provided. The base station includes a transmitter configured to transmit, to a terminal, information for a precoder, a receiver configured to receive, from the terminal, a first packet on the transmitted precoder and feeds back a channel output of the received first packet, and a controller configured to determine information for transmitting a second packet based on the channel output, to control to transmit the determined information for transmitting a second packet to the terminal, and to control to receive a second packet from the terminal, wherein the second packet is a variant of an original signal prepared using the COF and the transmitted information for transmitting the second packet.

In accordance with another aspect of the present disclosure, a method for receiving a signal using a channel output feedback in a base station is provided. The method includes transmitting information for a precoder to a terminal, receiving a first packet on the transmitted precoder from the terminal, feeding back a channel output of the received first packet to the terminal, determining information for transmitting a second packet based on the channel output, transmitting the determined information for transmitting a second packet to the terminal, and receiving a second packet from the terminal, wherein the second packet is a variant of an original signal prepared using the COF and the transmitted information for transmitting the second packet.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description when taken in conjunction with the accompanying drawings, in which.

Throughout the drawings, it should be noted that like reference numbers are used to depict the same or similar elements, features, and structures.

DETAILED DESCRIPTION

Figure 1:
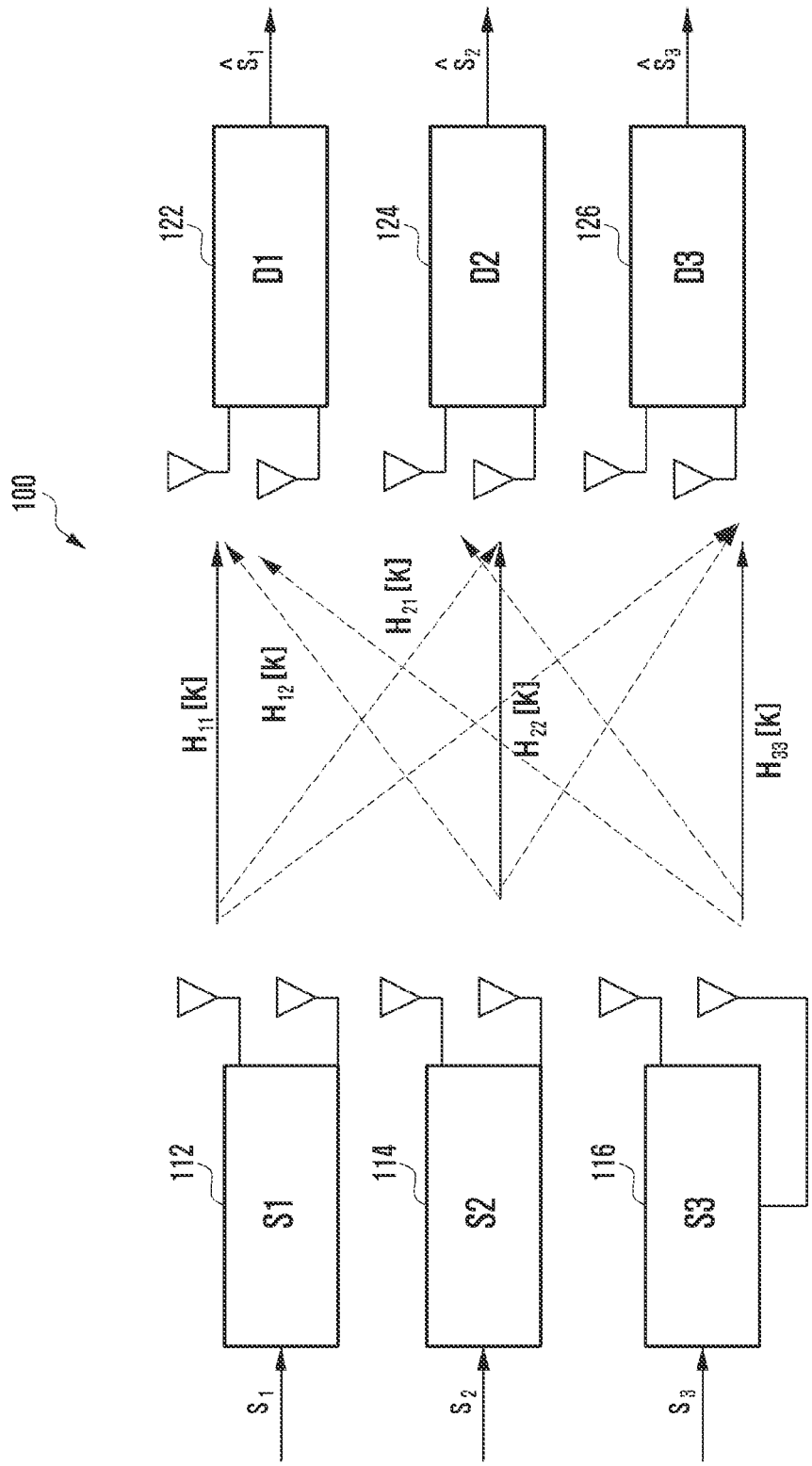
FIG. 1 is a diagram illustrating a system model for a 3-user wireless communication system with interference according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The following terms are defined in consideration of the functionality in embodiments of the present disclosure, and may vary according to the intention of a user or an operator, usage, etc. Therefore, the definition should be made on the basis of the overall content of the present specification.

Mobile communication systems have evolved into high-speed, high-quality wireless packet data communication systems that provide data and multimedia services beyond the early voice-oriented services. Recently, various mobile communication standards, such as, for example, High Speed Downlink Packet Access (HSDPA), High Speed Uplink Packet Access (HSUPA), Long Term Evolution (LTE), and LTE-Advanced (A) defined in $3^{rd}$ Generation Partnership Project (3GPP), High Rate Packet Data (HRPD) defined in $3^{rd}$ Generation Partnership Project-2 (3GPP2), and 802.16 defined by the Institute of Electrical and Electronics Engineers (IEEE), have been developed to support the high-speed, high-quality wireless packet data communication services.

Existing $3^{rd}$ generation mobile communications, including LTE, Ultra Mobile Broadband (UMB), and 802.16m, operate based on a multi-carrier multiple access scheme and adopt Multiple Input Multiple Output (MIMO) with channel sensitive scheduling, such as beam forming and Adaptive Modulation and Coding (AMC), to improve transmission efficiency. These techniques increase the system throughput by improving transmission efficiency in such a way as to concentrate transmit power of a plurality of antennas, adjusting an amount of transmit data, and selectively transmitting data to the user with a best channel quality. Since most of these techniques operate based on the channel state information between the base station (e.g., evolved Node B (eNB)) and the terminal (e.g., User Equipment (UE) or Mobile Station (MS)), the eNB or UE has to measure the channel state between the eNB and the UE. At this time, the signal used for channel state measurement is a Channel State Indication Reference Signal (CSI-RS). The eNB is a transmitter in downlink and a receiver in uplink. The one eNB may manage a plurality of cells for transmission/reception. A mobile communication system includes a plurality of eNBs distributed geographically, and each eNB performs transmission/reception through a plurality of cells.

Existing $3^{rd}$ and $4^{th}$ Generation mobile communication systems represented by LTE/LTE-A adopt a MIMO scheme with a plurality of transmit and receive antennas to transmit a plurality of information streams as spatially separated. This technique of transmitting the plurality of information streams as spatially separated is referred to as spatial multiplexing. Typically, the number of information streams capable of being spatially multiplexed depends on the number of antennas of the transmitter and the receiver. The number of information streams that can be spatially multiplexed is referred to rank in general. In the case of the MIMO scheme until the standard of LTE/LTE-A Release 11, the spatial multiplexing of up to 8×8 antennas and up to rank 8 are supported.

The Full Dimension (FD)-MIMO system, to which a technique proposed in an embodiment of the present disclosure is applied, has been evolved from the LTE/LTE-A MIMO system supporting up to 8 transmit antennas so as to support 32 or more transmit antennas. However, the scope of the present disclosure is not limited thereto.

In the present disclosure, a couple of scenarios are looked at where channel output feedback might be beneficial for next generation of wireless systems. In particular, the following will be looked at: (a) simple multi-user scenario involving just three users, and (b) incorporation of channel output feedback in hybrid-Automatic Repeat Request (ARQ). The present disclosure's goal is to show the advantages that the channel output feedback may offer for the next generation wireless systems.

FIG. 1 is a diagram illustrating a system model for a 3-user wireless communication system with interference according to an embodiment of the present disclosure.

Referring to FIG. 1, a system model 100 includes sources 112, 114, 116 and destination 122, 124, 126. The sources 112, 114, 116 and the destination 122, 124, 126 each have a plurality of antennas. In the following description, the number of the antennas of the sources 112, 114, 116 and the destination 122, 124, 126 is referred as M.

Consider a K-user interference channel with each source 112, 114, 116 and destination 122, 124, 126 having M antennas each as shown in FIG. 1. Herein, K is the number of sources. Also, assume that there is a very high rate feedback link available from the destinations 122, 124, 126 to the sources 112, 114, 116 through which the sources have access to previous Channel State (CSI) and Channel Output Feedback(COF) received at the destinations 122, 124, 126. The channel between the source 1, and the destination k, is represented by the matrix $H_{k,l}$.

The COF feedback means that each destination feeds back the exact signal $y_l[k]$ received by it to the source. In other words, when designing the signal $x_l[k+1]$, the source has access to previous CSI $H_{l,d}[k]$, and the previous COF $y_l[k]$. However this is same as having additional side-information given by $y_l[k]-H_{l,d}[k]x_l[k]$, i.e., interference+noise seen by the destination at time k.

For the first transmission over transmission time interval, no channel output feedback is available at the source, hence the signals transmitted are given by Equation (1) below.

$$x_h[1]=\sqrt{\rho F_k}[1]s_1, \quad 1 \leq k \leq K, \quad \text{Equation (1)}$$

where $F_k[1]$ is the orthonormal precoding matrix used by the source k. Furthermore, $E[x_k[1]^* x_k[1]]=\rho$.

However, during the second transmission time interval, due to the availability of the channel output information, the source now transmits a linear combination of the message $s_k$ and the side-information acquired through the feedback. Hence, the signals transmitted over the second time duration is given by Equation (2) below.

$$x_k[2] = \alpha_k F_k[2]s_k + \beta_k G_k[2]\left(\sum_{l=1,l\neq k}^{K} H_{k,l}[1]x_l[1] + z_k[1]\right)$$
$$= \alpha_k F_k[2]s_k + \beta_k G_k[2]\left(\sqrt{\rho}\sum_{l=1,l\neq k}^{K} H_{k,l}[1]F_l[1]s_l + z_k[1]\right).$$

Equation (2)

where the scalar coefficients $\alpha_k$ and $\beta_k$ are chosen to ensure that power constraint is satisfied at the source. Here again it is assumed that the precoding matrix $G_k[2]$ is orthogonal. In other words, $G^*_k[2]G_k[2]=G_k[2]G^*_k[2]=I$.

The additive complex Gaussian noise is assumed to be white with $E[z[k]z^*[k]]=I$. With this signal transmitted from source, the signal received at the destination is given by Equation (3) below.

$$y_k[2] = \sum_{l=1}^{K} H_{k,l}[2]x_l[2] + z_k[2]$$

$$= \sum_{l=1}^{K} H_{k,l}[2]\left(\alpha_l F_l[2]s_l + \beta_l G_l[2]\left(\sqrt{\rho}\sum_{m=1,m\neq l}^{K} H_{l,m}[1]F_m[1]s_m + z_l[1]\right)\right) + z_k[2]$$

$$= \sum_{l=1}^{K}\left(\alpha_l H_{k,l}[2]F_l[2] + \sqrt{\rho}\sum_{m=1,m\neq l}^{K} \beta_m H_{k,m}[2]G_m[2]H_{m,l}[1]F_l[1]\right)s_l + \sum_{l=1}^{K} \beta_l H_{k,l}[2]G_l[2]z_l[1] + z_k[2].$$

Equation (3)

Here the signal of interest for the k'th user is given by Equation (4) below.

$$\left(\alpha_k H_{k,k}[2]F_k[2] + \sqrt{\rho} \sum_{m=1, m \neq k}^{K} \beta_m H_{k,m}[2]G_m[2]H_{m,k}[1]F_k[1]\right) s_k. \quad \text{Equation (4)}$$

Other than this, all the other remaining terms act as mere interference and/or noise. Interference is now defined to be the power present in the non-intended signal component at the receiver k. Therefore, there is provided Equation (5) below.

$$IA_k[2] = \sum_{l=1, l \neq k}^{K} \left\| W_k^*[2] \left( \alpha_l H_{k,l}[2]F_l[2] + \sqrt{\rho} \sum_{m=1, m \neq l}^{K} \beta_m H_{k,m}[2]G_m[2]H_{m,l}[1]F_l[1] \right) \right\|_p^2 + \sum_{l=1}^{K} \|\beta_l W_k^*[2]H_{k,l}[2]G_l[2]\|_F^2, \quad \text{Equation (5)}$$

where Wk[2] is the combiner at the destination. Due to the matrix $G_l[2]$ being unitary, the Equation (5) can be further simplified to Equation (6) below.

$$IA_k[2] = \sum_{l=1, l \neq k}^{K} \left\| W_k^*[2] \left( \alpha_i H_{k,l}[2]F_i[2] + \sqrt{\rho} \sum_{m=1, m \neq l}^{K} \beta_m H_{k,m}[2]G_m[2]H_{m,l}[1]F_l[1] \right) \right\|_p^2 + \sum_{l=1}^{K} \beta_l^2 \|W_k^*[2]H_{k,f}[2]\|_F^2. \quad \text{Equation (6)}$$

Note that, $F_k[2]$ and $G_k[2]$ are constrained to be orthonormal matrices, i.e., $$F^*_k[2]F_k[2]=I,$$

$$G^*_k[2]G_k[2]=I.$$

As a result, the power constraint at each of the source k is given by Equation (7) below.

$$\alpha_k^2 + \beta_k^2 \left( \rho \sum_{l=1, l \neq k}^{K} \|H_{k,l}[1]F_l[1]\|_F^2 + M \right) = \rho. \quad \text{Equation (7)}$$

The following description is directed to an optimization problem. The goal now is to minimize the sum of interference over all the users during the second transmission time interval subject to the power constraints at the sources. In other words, the problem can be described as Equation (8) below.

$$\min_{\{F_k[2], G_k[2], W_k[2], \alpha_k\}_{k=1}^{K}} \sum_{k=1}^{K} IA_k[2] \quad \text{Equation (8)}$$

$$\text{s.t.} \quad \alpha_k^2 + \beta_k^2 \left( \rho \sum_{l=1, l \neq k}^{K} \|H_{k,l}[1]F_l[1]\|_F^2 + M \right) = \rho.$$

Minimizing the sum of interference is a natural objective function to choose for multi-user systems. This is so because at high SNR, the communication is only limited by the interference term. In fact this metric has been used previously in Reference [2] to design only the linear precoder $F_k$ with no channel output feedback.

Looking at the optimization problem in the Equation (8), it is not very clear how to perform the optimization. Therefore, proposed herein is a successive optimization approach in which only one value at a time is perturbed. In other words, the problem is addressed sequentially over the following variables, and then iterated:

Optimize over the linear precoder for message at the source $\{F_k[2]\}_{k=1}^{K}$;

Optimize over the linear precoder for side-information at the source $\{G_k[2]\}_{k=1}^{K}$; and Optimize over the linear combiner at the receiver $\{W_k[2]\}_{k=1}^{K}$.

The iterative optimization of the original problem has been explained in the algorithm of Table 1 below. In some examples, the algorithm may be best incorporated for the uplink transfer of data from the user to its base station. For an example, the algorithm may be incorporated for the uplink transfer of data from a plurality of UEs to a plurality of base-stations in the LTE system.

TABLE 1

| Algorithm 1 Iteratively Optimized Coding Scheme |
| --- |
| 1: Initialize: $F_k[1]$, $F_k^{(0)}[2]$ for each of the user using Algorithm in [2] |
| 2: $\alpha_k^{(0)} = \sqrt{\rho}, \beta_k^{(0)} = 0$ for each user |
| 3: $W_k^{(0)}[2]$ is initialized based on $\{F^{(0)}_k[2]\}_{k=1}^{K}$ |
| 4: Initialize the value of interference sum $IA^{(0)}[2]$ based on $\{W_k^{(0)}[2]\}_{k=1}^{K}$ |
| 5: repeat |
| 6:   For each user k: |
| 7:     Generate a random candidate unitary matrix $U_k$ |
| 8:     With $U_k$ as a unitary precoder for user k, calculate the optimal β using (31) |
| 9:     If interference sum is lower with $U_k$, set $G_k^{(i)}[2] = U_k, \beta_k^{(i)} = \beta$ |
| 10:   Update the linear precoders $\{F_k^{(i)}[2]\}_{k=1}^{K}$ using (18) |
| 11:   Calculate new values of orthonormal matrices $\{W_k^{(i)}[2]\}_{k=1}^{K}$ |
| 12: until termination condition met |

The following description is directed to the optimization algorithm for each of the above problems.

First, the following description is directed to optimization over F. For optimization over just $\{F_k[2]\}_{k=1}^{K}$, the problem in the Equation (8) can be rewritten as Equation (9) below.

$$\min_{\{F_k[2]\}_{k=1}^{K}} \sum_{k=1}^{K} \sum_{l=1, l \neq k}^{K} \left\| W_k^*[2] \left( \alpha_l H_{k,l}[2] F_l[2] + \sqrt{\rho} \left( \sum_{m=1, m \neq l}^{K} \beta_m H_{k,m}[2] G_m[2] H_{m,l}[1] \right) F_l[1] \right) \right\|_F^2 \quad \text{Equation (9)}$$

s.t. $F_k^*[2] F_k[2] = I.$

Swapping the order of summation, the problem can be rearranged as Equation (10) below.

$$\min_{\{F_k[2]\}_{k=1}^{K}} \sum_{l=1}^{K} \sum_{k=1, k \neq l}^{K} \left\| W_k^*[2] \left( \alpha_l H_{k,l}[2] F_l[2] + \sqrt{\rho} \left( \sum_{m=1, m \neq l}^{K} \beta_m H_{k,m}[2] G_m[2] H_{m,l}[1] \right) F_l[1] \right) \right\|_F^2 \quad \text{Equation (10)}$$

s.t. $F_k^*[2] F_k[2] = I.$

It is easy to see that the optimization over each of the F'[2] can be performed independently. For a given F'[2], the objective function can be written as Equation (11) below.

$$\sum_{k=1, k \neq l}^{K} \| A_{k,l} F_l[2] + B_{k,l} \|_F^2, \quad (14)$$

where $$A_{k,l} = \alpha_l W_k^*[2] H_{k,l}[2].$$

$$B_{k,l} = W_k^*[2] \left( \sqrt{\rho} \sum_{m=1, m \neq l}^{K} \beta_m H_{k,m}[2] G_m[2] H_{m,l}[1] \right) F_l[1]. \quad \text{Equation (11)}$$

Stacking these matrices at the top of each other, the overall optimizing function reduces to Equation (12) below.

$$\min_{F_l[2]} \| A_l F_l[2] + B_l \|_F^2 \quad \text{Equation (12)}$$

s.t. $F_l^*[2] F_l[2] = I.$ with the understanding that if k=', then $A_{k,l}$=0 and $B_{k,l}$=0. The optimization problem in Equation (12) is an optimization over Stiefel-manifold. This problem is also known as Procrustes projection problem. However no closed or optimal solution exists for this problem. Therefore, it is proposed herein to use a related-art iterative technique outlined in Reference [6] to come up with the local minimum solution.

The following description is directed to Optimization over G. In this case, it is not possible to optimize over each of the Gp[2] independently. For a given user p, the optimization problem can be written as Equation (13) below.

$$\min_{G_p[2]} \sum_{l=1, l \neq p}^{K} \sum_{k=1, k \neq l}^{K} \left\| W_k^*[2] \left( \alpha_l H_{k,l}[2] F_l[2] + \sqrt{\rho} \left( \sum_{m=1, m \neq k, p}^{K} \beta_m H_{k,m}[2] G_m[2] H_{m,l}[1] + \beta_p H_{k,p}[2] G_p[2] H_{p,l}[1] \right) F_l[1] \right) \right\|_F^2 \quad \text{Equation (13)}$$

s.t. $G_p^*[2] G_p[2] = I.$

Equivalently, the objective function can be abstracted as Equation (14) below.

$$\sum_{l=1, l \neq p}^{K} \sum_{k=1, k \neq l}^{K} \| A_{k,l,p} + B_{k,l,p} G_p C_{p,l} \|_F^2, \quad \text{Equation (14)}$$

where $$A_{k,l,p} = W_k^*[2] \left( \alpha_l H_{k,l}[2] F_l[2] + \sqrt{\rho} \left( \sum_{m=1, m \neq l, p}^{K} \beta_m H_{k,m}[2] G_m[2] H_{m,l}[1] \right) F_l[1] \right),$$

$$B_{l,k,p} = \beta_p W_k^*[2] H_{k,p}[2],$$

$$C_{p,l} = \sqrt{\rho} \, H_{p,l}[1] F_l[1],$$

with the understanding that $A_{k,l,p}$=0 and $B_{k,l,p}$=0. if k=' or '=p.

Again stacking them based on the value of k, the overall optimization reduces to Equation (15) below.

$$\min_{G_p[2]} \sum_{l=1, l \neq p}^{K} \| A_{l,p} + B_{l,p} G_p C_{p,l} \|_F^2. \quad \text{Equation (15)}$$

s.t. $G_p^*[2] G_p[2] = I.$

While, if there is only a single term in the summation, the problem is a modified version of the Procrustes problem of Reference [5], it is not clear how the solution to an arbitrary sum can be obtained. Therefore a randomization method to select the matrix Gp[2] in the algorithm of the Table 1 is suggested.

The following description is directed to Optimization over R. In this subsection, optimizing over the optimal power allocation between the two linear precoders at the source p, Fp[2] and Gp[2], are looked at. As before, the total interference term for all the users can be written as Equation (16) below.

$$IA[2] = \sum_{l=1}^{K} \sum_{k=1, k \neq l}^{K} \left\| W_k^*[2]H_{k,l}[2]\alpha_l F_l[2] + W_k^*[2]\left(\sum_{m=1,m \neq l}^{K} \sqrt{\rho}\, H_{k,m}[2]\beta_m G_m[2]H_{m,l}[1]\right)F_l[1] \right\|_F^2 + \sum_{l=1}^{K} \beta_l^2 \sum_{k=1}^{K} \|W_k^*[2]H_{k,l}[2]\|_F^2. \quad \text{Equation (16)}$$

Therefore, for the pth user the relevant terms are written as Equation (17) below.

Equation (17)

$$\sum_{l=1,l \neq 1}^{K} \sum_{k=1,k \neq l}^{K} \left\| W_k^*[2]H_{k,l}[2]\alpha_l F_l[2] + W_k^*[2]\left(\sum_{m=1,m \neq l,p}^{K} \sqrt{\rho}\, H_{k,m}[2]\beta_m G_m[2]H_{m,l}[1]\right)F_l[1] + \sqrt{\rho}\, W_k^*[2]H_{k,p}[2]\beta_l G_p[2]H_{p,f}[1]F_l[1] \right\| + $$

$$\sum_{k=1,k \neq p}^{K} \left\| W_k^*[2]H_{k,p}[2]\alpha_l F_l[2] + W_l^*[2]\left(\sum_{m=1,m \neq p}^{K} \sqrt{\rho}\, H_{k,m}[2]\beta_m G_m[2]H_{m,p}[1]\right)F_l[1] \right\|_F^2 + $$

$$\beta_p^2 \sum_{k=1}^{K} \|W_k^*[2]H_{k,p}[2]\|_F^2.$$

The above can be put easily in a nicer form as Equation (18) below.

$$\sum_{l=1,l \neq p}^{K} \sum_{k=1,k \neq l}^{K} \|A_{k,l,p} + \beta_p B_{k,l,p}\|_F^2 + \quad \text{Equation (18)}$$

$$\sum_{k=1,k \neq p}^{K} \|\alpha_p C_{k,p} + D_{k,p}\|_F^2 + \beta_p^2 c_p,$$

where $$A_{k,l,p} = W_k^*[2]H_{k,l}[2]\alpha_l F_l[2] + W_k^*[2]\left(\sum_{m=1,m \neq l,p}^{K} \sqrt{\rho}\, H_{k,m}[2]\beta_m G_m[2]H_{m,l}[1]\right)F_l[1]$$

$$B_{k,l,p} = W_k^*[2]H_{k,p}[2]G_p[2]H_{p,l}[1]F_l[1]$$

$$C_{k,p} = W_k^*[2]H_{k,p}[2]F_p[2]$$

$$D_{k,p} = W_k^*[2]\left(\sum_{m=1,m \neq p}^{K} \sqrt{\rho}\, H_{k,m}[2]\beta_m G_m[2]H_{m,p}[1]\right)F_p[1]$$

$$c_p = \sum_{k=1}^{K} \|W_k^*[2]H_{k,p}[2]\|_F^2.$$

Now, staking all of them together in a big matrix, the optimization for the allocation for the pth user can be described as Equation (19) below.

$$\min_{\alpha_p, \beta_p} \|A_p + \beta_p B_p\|_F^2 + \|\alpha_p C_p + D_p\|_F^2 + \beta_p^2 c_p, \quad \text{Equation (19)}$$

$$\text{s.t. } \alpha_p^2 + \gamma_p \beta_p^2 = p,$$

$$\text{where } \gamma_p = \left(\sum_{l=1,l \neq p}^{K} \|H_{p,l}[1]F_l[1]\|_F^2 + M\right).$$

To address the problem in Equation (19), Lagrange multipliers may be used. This results in a quartic polynomial whose every root can be a possible candidate for the minimization. Checking each of the four points for minimization, the point that minimizes the objective function the most is chosen.

The following description is directed to optimization over W.

The optimization over the received combiner is relatively simple. It simply involves projecting the received signal yk[2] along the directions having the least amount of interference. If the user k, expects to receive a signal $s_k$ of dimension q, the received signal is projected along the weakest q directions (e.g., minimum eigen value) of the noise plus interference covariance matrix.

The following description is directed to present some simulations based on the Algorithm of Table 1 to demonstrate the advantages of using channel output feedback for multi-user systems. To keep the analysis simple, it is assumed that each entry of the channel $H_{k,l}$ is a complex Gaussian random variable with zero mean and unit variance. The simulations are presented for K=3 users. Each user and destination is assumed to have M=4 antennas. Furthermore, all the value reported have been averaged over 1,000 channel realizations.

Figure 2:
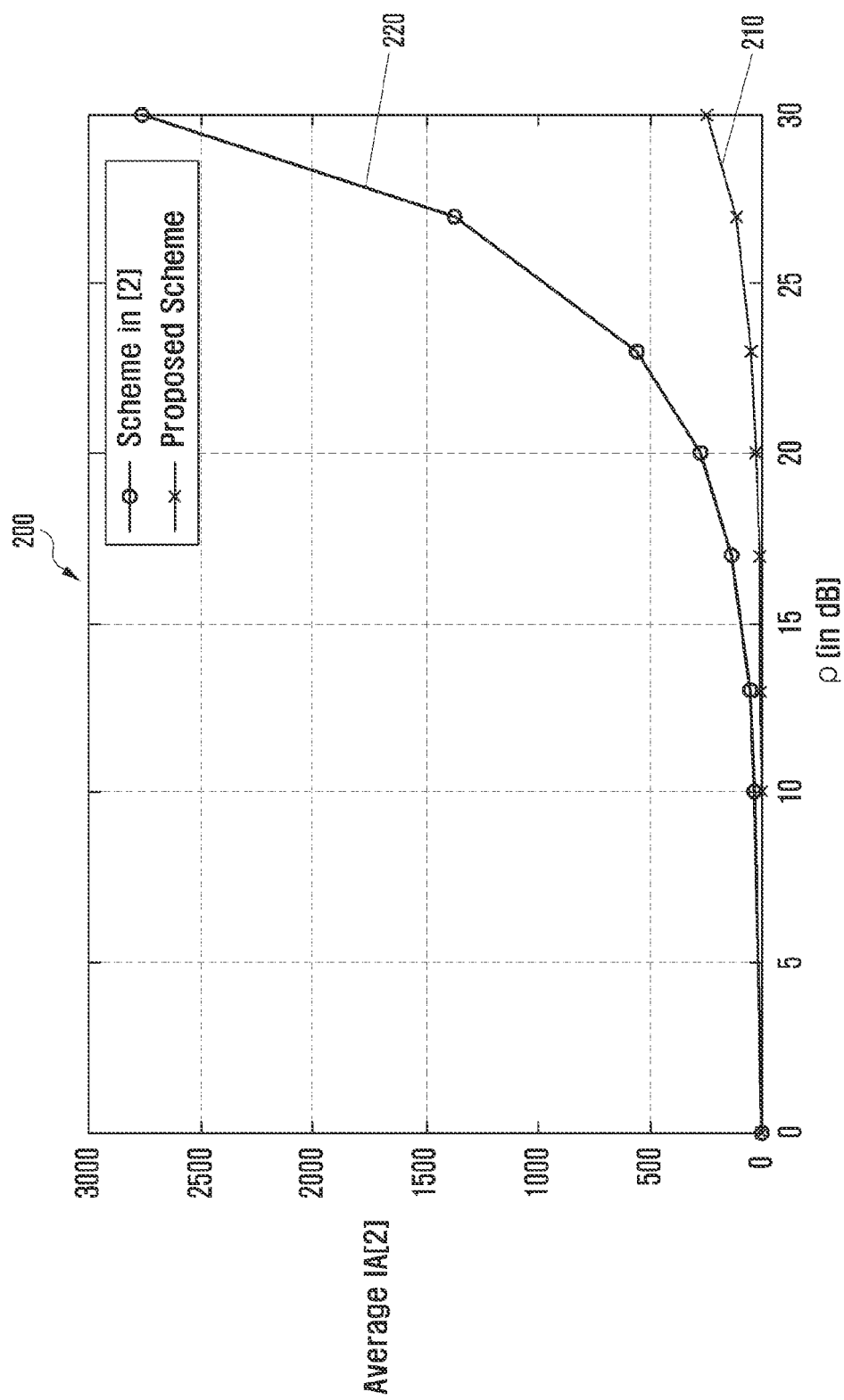
FIG. 2 is a diagram illustrating plot of variation of interference as a function of the power at a source according to an embodiment of the present disclosure.

FIG. 2 is a diagram illustrating plot of variation of interference as a function of the power at a source according to an embodiment of the present disclosure. A graph of FIG. 2 plots the result of the simulations for K=3 users with each user and destination having 4 antennas each and transmitting two streams, i.e., $s_k \in \mathbb{C}^{2 \times l}$ Referring to FIG. 2, Graph 200 plots the total sum of interference for the system in the Equation (8) as a function of the power at the source p. For comparison, Graph 200 plots the scheme in Reference [2] which relies only on channel state feedback. A curved line 210 presents the result of the simulation performed by a method according to the present disclosure and a curved line 220 presents the result of the simulation performed by a method of Reference [2].

It can be seen that with the help of channel output feedback, dramatic reductions in the average interference can be achieved. Consistently, the average interference can be reduced by a factor of 10 and more, across most of the power regime of interest.

Figure 3:
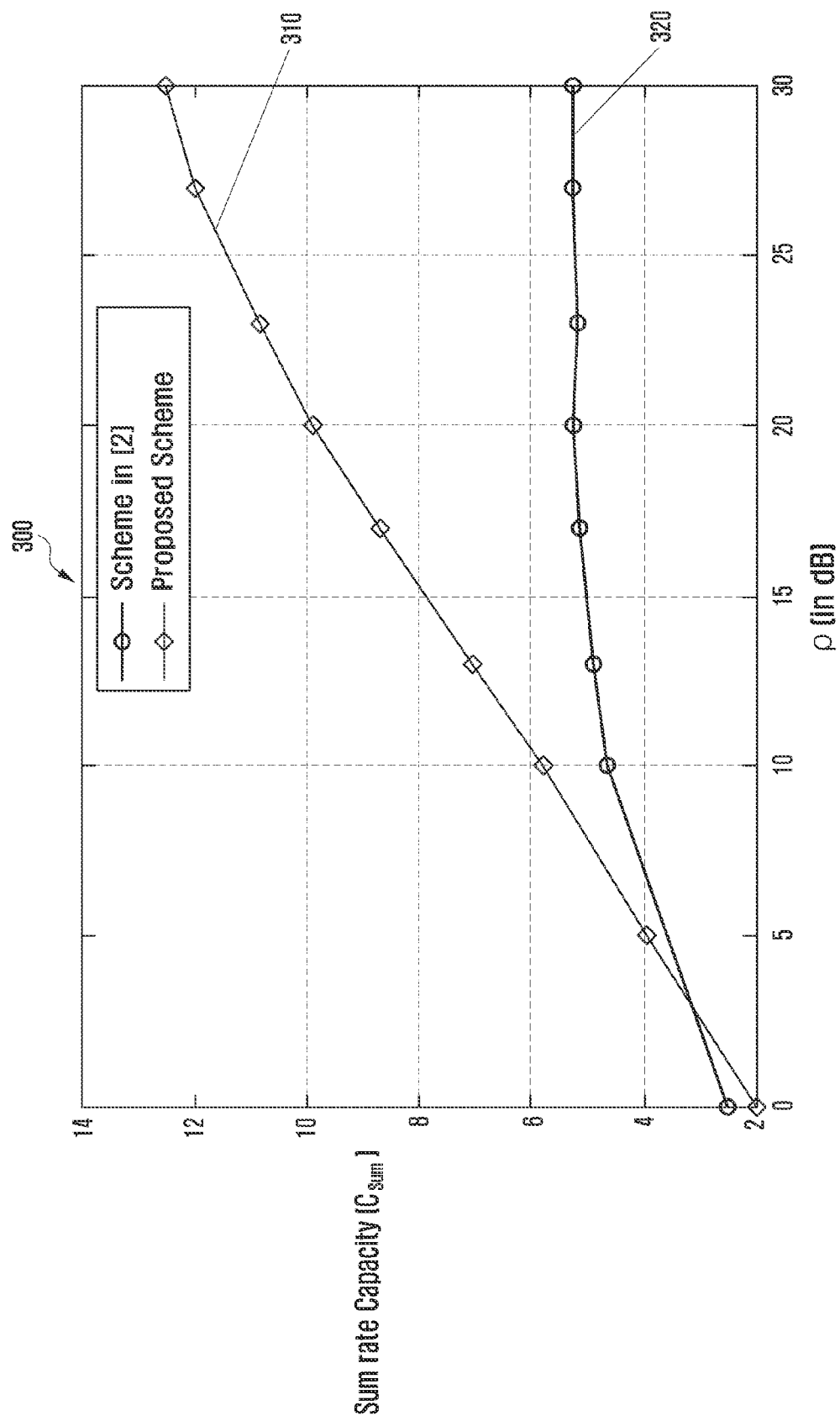
FIG. 3 is a diagram illustrating plot of variation of the sum rate capacity as a function of the power at a source according to an embodiment of the present disclosure.

FIG. 3 is a diagram illustrating plot of variation of the sum rate capacity as a function of the power at a source according to an embodiment of the present disclosure. A graph of FIG. 3 plots the result of the simulations for K=3 users with each user and destination having 4 antennas each and transmitting two streams, i.e., $s_k \in \mathbb{C}^{2\times l}$ Referring to FIG. 3, graph 300 tries to capture the effect that the channel output feedback has on the sum rate capacity of the system. Before proceeding, some terms are defined to make the exposition clear.

The Signal-to-Interference-Noise Ratio (SINR) for the kth stream is defined as Equation (20) below.

$$SINR_k = \frac{\text{Signal Power}}{\text{Noise} + \text{Interference Power}}$$

$$= \frac{\left\| W_k^*[2]\left( \alpha_k H_{k,k}[2]F_k[2] + \sqrt{\rho} \sum_{m=1,m\neq k}^{K} \beta_m H_{k,m}[2]G_m[2]H_{m,k}[1]F_k[1] \right) \right\|_F^2}{M + IA_k[2]}.$$

Equation (20)

Based on the above definition, the sum-rate is defined as Equation (21) below.

$$C_{sum} = \sum_{k=1}^{K} \log(1 + SINR_k).$$

Equation (21)

A curved line 310 presents the result of the simulation performed by a method according to the present disclosure and a curved line 320 presents the result of the simulation performed by a method of Reference [2].

Now, as can be seen from graph 300, the channel output feedback aids in significantly improving the sum rate capacity of the system. Even at a moderate power of ρ=20 dB, the capacity almost doubles. Furthermore, while the capacity tends to get saturated with only CSI feedback as in Reference [2], with channel output feedback, it continues to improve as more and more power is made available at the source. The performance of the proposed scheme is only slightly worse for very low power regime in which the scheme in Reference [2] outperforms the one presented here.

This set up of the simulations of FIG. 2 and FIG. 3 can be best incorporated for the uplink transfer of data from the user to its base station in the LTE system.

Figure 4:
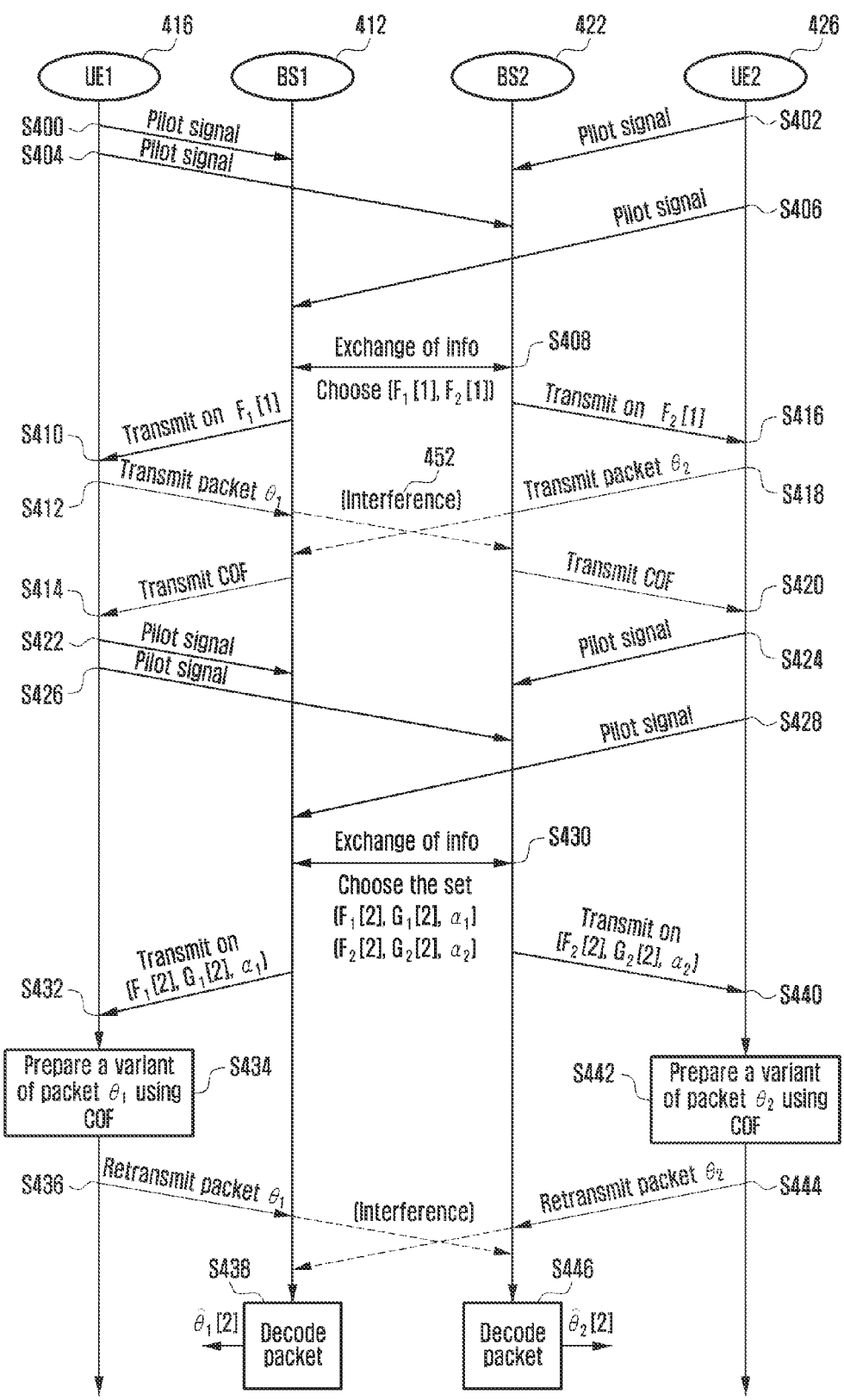
FIG. 4 is a flowchart illustrating an example of transmitting and receiving a signal using a channel output feedback according to an embodiment of the present disclosure.

FIG. 4 is a flowchart illustrating an example of transmitting and receiving a signal using a channel output feedback according to an embodiment of the present disclosure. FIG. 4 demonstrates the flow of information that would take place involving two users and two base stations. Note however that the scheme is easily extendable to a K case scenario.

Referring to FIG. 4, a UE1 416 transmits a Pilot signal to a BS1 412 at operation S400.

A UE2 426 transmits a Pilot signal to the BS1 412 at operation S406. BS1 412 learns about the channels conditions H1;1[1] and H1;2[1] via training based on the transmitted Pilot signals.

The UE1 416 transmits a Pilot signal to a BE2 422 at operation S404.

The UE2 426 transmits a Pilot signal to the BE2 422 at operation S402. The BS2 422 learns about the channels conditions H2;2[1] and H2;1[1] via training based on the transmitted Pilot signals.

The BS1 412 and the BS2 422 communicate with each other to choose the optimal precoders F1[1] and F2[1] that the UE1 and the UE 2 should be using respectively at operation S408.

The BS1 412 calculates for the best precoder and transmits the entry in a codebook of orthonormal matrices closest to the calculated precoder to the UE1 416 at operation S410.

The UE1 416 transmits its packet on the precoder as requested by the mother base station 416 at operation S412.

The BS1 412 receives the packet transmitted by UE1 416. However this packet reception sees interference 452 from the other user UE2 426. The BS1 412 feeds back the channel output to the UE1 416 at operation S414. Herein, the COF from the BS1 412 to the UE1 416 can be sent either via Physical Downlink Control Channel (PDCCH) or Physical Downlink Shared Channel (PDSCH). However due to more data carrying capability of PDSCH, PDSCH will be a preferred choice in case it is available.

The BS2 422 calculates for the best precoder and transmits the entry in a codebook of orthonormal matrices closest to the calculated precoder to the UE2 426 at operation S416.

The UE2 426 transmits its packet on the precoder as requested by the mother base station 426 at operation S418.

The BS2 422 receives the packet transmitted by UE2 426. However this packet reception sees interference 452 from the other user UE1 416. The BS2 422 feeds back the channel output to the UE2 426 at operation S420. Herein, the COF from the BS2 422 to the UE2 426 can be sent either via PDCCH or PDSCH. However due to more data carrying capability of PDSCH, PDSCH will be a preferred choice in case it is available.

The UE1 416 transmits a Pilot signal to a BS1 412 at operation S422.

The UE2 426 transmits a Pilot signal to the BS1 412 at operation S428. The BS1 412 learns about the channels conditions H1;1[1] and H1;2[1] via training based on the transmitted Pilot signals.

The UE1 416 transmits a Pilot signal to the BE2 422 at operation S426.

The UE2 426 transmits a Pilot signal to the BE2 422 at operation S424. The BS2 422 learns about the channels conditions H2;2[1] and H2;1[1] via training based on the transmitted Pilot signals.

The BS1 412 and the BS2 422 exchange information with each other, to decide on the best set of (F1[2];G1[2];α₁) and (F2[2];G2[2];α₂) to use for the next transmission by the UE1 416 and the UE2 426 at operation S430.

The BS1 412 transmits, to the UE1 416, the entry in a codebook closest to the optimal values calculated at operation S432. Herein, the BS1 412 may transmit F1[2], G1[2], $\alpha_1$ to the UE 1 416.

The UE1 416 prepares the variants of the original packet based on the information transmitted at operation S432 to send the transmission for the second transmission time interval at operation S434. Herein, as outlined in the Equation 2, the UE1 416 may prepare the variants of the original packet based on the Equation 2.

The UE1 416 transmits the variants of the original packet to the BS1 412 at operation S436.

The BS1 412 receives and decodes the variants of the original packet at operation S438.

The BS2 422 transmits, to the UE2 426, the entry in a codebook closest to the optimal values calculated at operation S440. Herein, the BS2 422 may transmit F2[2], G2[2], $\alpha_2$ to the UE2 426.

The UE2 426 prepares the variants of the original packet based on the information transmitted at operation S440 to send the transmission for the second transmission time interval at operation S442. Herein, as outlined in the Equation 2, the UE2 426 may prepare the variants of the original packet based on the Equation 2.

The UE2 426 transmits the variants of the original packet to the BS2 422 at operation S444.

The BS2 422 receives and decodes the variants of the original packet at operation S446.

Currently Uplink Control Information (UCI) carries mainly three things: (1) Scheduling Request (SR), (2) Hybrid Automatic Repeat Request (HARQ) ACKnowledgement (ACK)/Negative ACK (HACK), and (3) Channel Quality Indicator (CQI). Note that each UE can transmit varying amount of streams in our proposed scheme. As a result, Rank Indicator (RI) has to be reported with the present scheme. Furthermore, Precoding Matrix Index (PMI) and CQI are used for any advanced technique involving interference alignment. As regards to the frequency of COF is concerned, it is a direct function of the performance desired from a system. As has been shown, even with one additional COF substantial reduction in interference can be achieved. Therefore there is a trade-off involved between the amount of COF and the interference reduction possible.

Figure 5:
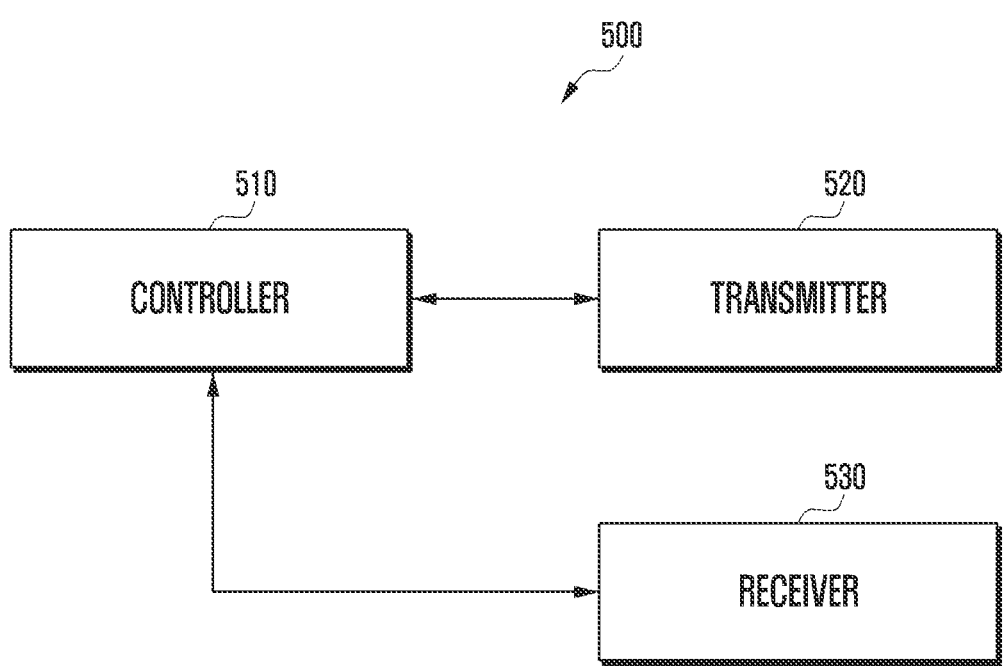
FIG. 5 is a block diagram showing an example of the configuration of a terminal for transmitting a signal using a channel output feedback according to an embodiment of the present disclosure.

FIG. 5 is a block diagram showing an example of the configuration of a terminal for transmitting a signal using a channel output feedback according to an embodiment of the present disclosure.

Referring to FIG. 5, a terminal 500 includes a controller 510, transmitter 520 and a receiver 530. The terminal may be the UE1 416 or the UE2 426 of FIG. 4.

The transmitter 520 transmits, to a base station, a first packet on a precoder received from the base station. The transmitter 520 further transmits a pilot signal to the base station. The precoder is selected based on the transmitted pilot signal.

The receiver 530 receives, from the base station, a COF of the transmitted first packet and information for transmitting a second packet. The information for transmitting the second packet is determined based on a channel output of the transmitted first packet. The information for transmitting the second packet includes at least one of information for a first precoder of a signal transmitted over a current time, information for a second precoder of a signal transmitted over a previous time, a first scalar coefficient for the first precoder and a second scalar coefficient for the second precoder. The information for the first precoder, the information for the second precoder of a signal, the first scalar coefficient, and the second scalar coefficient each may be $F_k[2]$, $G_k[2]$, $\alpha_k$ and $\beta_k$ of the Equation (2).

The controller 510 prepares a variant of the second packet using the COF and the received information for transmitting the second packet and controls to transmit the prepared variant to the base station.

Figure 6:
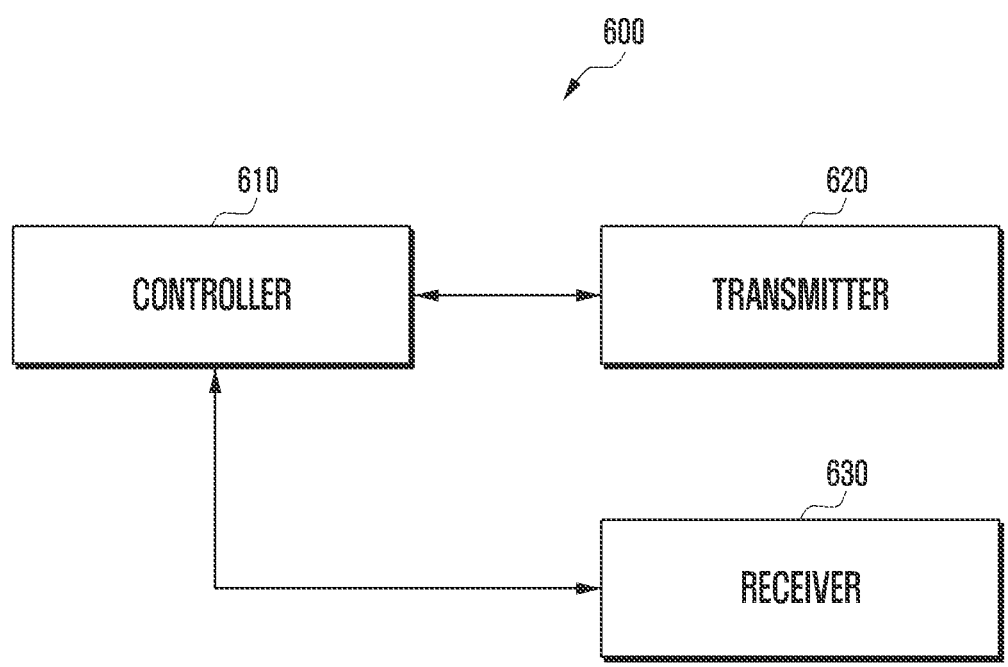
FIG. 6 is a block diagram showing an example of the configuration of a base station for transmitting a signal using a channel output feedback according to an embodiment of the present disclosure.

FIG. 6 is a block diagram showing an example of the configuration of a base station for transmitting a signal using a channel output feedback according to an embodiment of the present disclosure.

Referring to FIG. 6, a base station 600 includes a controller 610, transmitter 620 and a receiver 630. The base station 600 may be the BS1 412 or the BS2 422 of FIG. 4.

The transmitter 620 transmits, to a terminal, information for a precoder. The transmitter 620 receives a first pilot signal from the terminal and a second pilot signal from other terminal. The precoder is selected based on the first and second pilot signal.

The receiver 630 receives, from the terminal, a first packet on the transmitted precoder and the transmitter 620 feeds back a channel output of the received first packet.

The controller 610 determines information for transmitting a second packet based on the channel output, controls to transmit the determined information for transmitting a second packet to the terminal and receive a second packet from the terminal. The second packet is a variant of an original signal prepared using the COF and the transmitted information for transmitting the second packet. The information for transmitting the second packet includes at least one of information for a first precoder of a signal transmitted over a current time, information for a second precoder of a signal transmitted over a previous time, a first scalar coefficient for the first precoder and a second scalar coefficient for the second precoder. The information for the first precoder, the information for the second precoder of a signal, the first scalar coefficient, and the second scalar coefficient each may be $F_k[2]$, $G_k[2]$, $\alpha_k$ and $\beta_k$ of the Equation (2).

The receiver 630 receives information for other base station from the other base station. The information for transmitting the second packet is determined based further on the received information for the other base station.

The receiver 630 receives a first pilot signal from the terminal and a second pilot signal from other terminal and the transmitter 620 transmits information for the base station to other base station. The information for the base station is trained based on the first and second pilot signal.

The following description is directed to incorporating channel output feedback to hybrid-ARQ systems. The development of incorporating channel output feedback to hybrid-ARQ systems is very similar to the one already presented. In case of hybrid-ARQ, there is only single source and destination that are trying to communicate with each other. The fundamental idea of hybrid-ARQ is to use the traditional ARQ in co-operation with error-control coding schemes. Therefore, only in the case that the error protected first transmission of the packet fails, that the second transmission of the packet needs to be sent.

Figure 7:
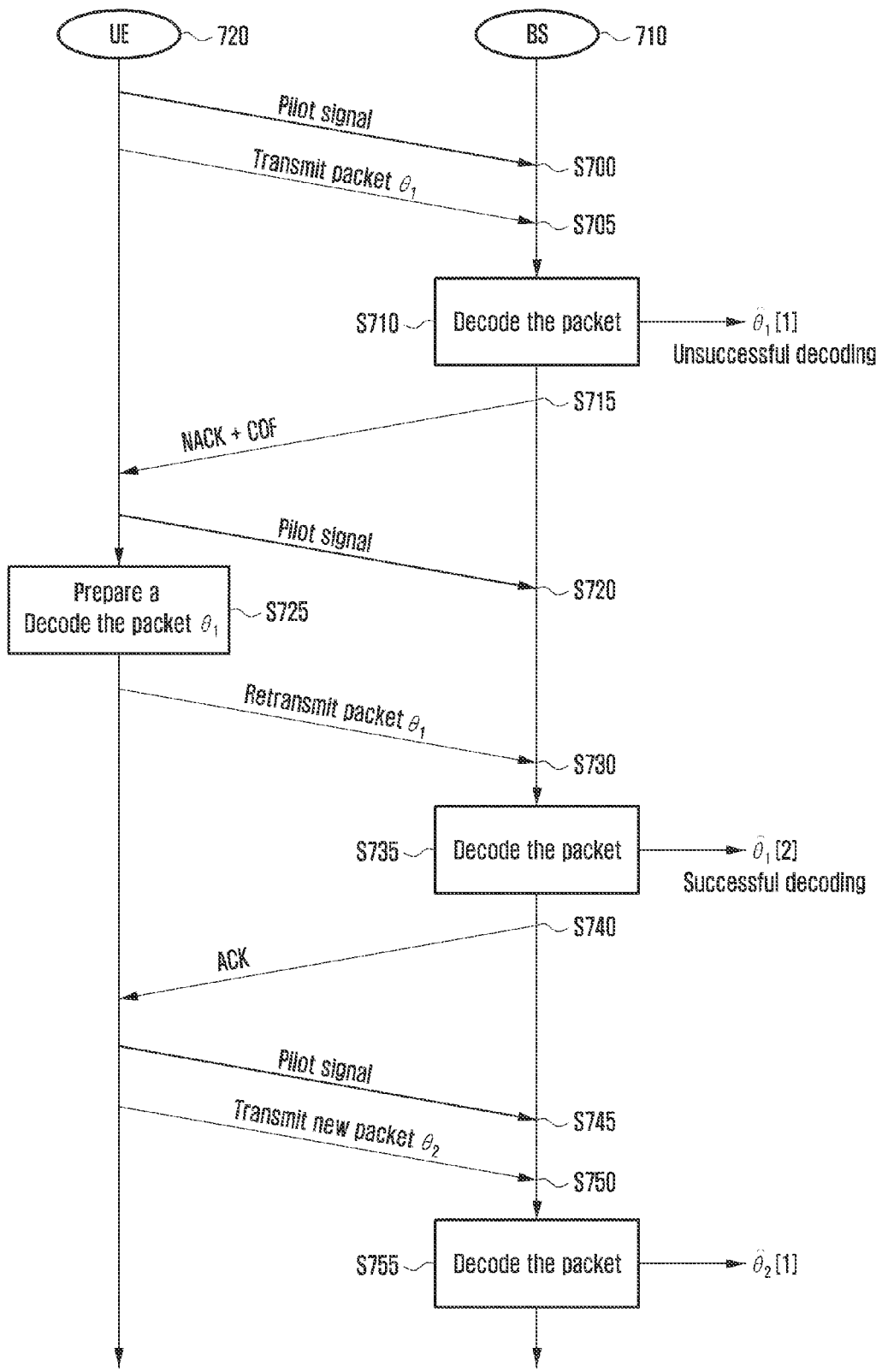
FIG. 7 is a flowchart illustrating another example of transmitting and receiving a signal using a channel output feedback according to an embodiment of the present disclosure.

FIG. 7 is a flowchart illustrating another example of transmitting and receiving a signal using a channel output feedback according to an embodiment of the present disclosure.

Referring to FIG. 7, a UE 720 transmits a Pilot signal to a BS 710 at operation S700. The BS 710 learns about the channel using the transmitted Pilot signal. Pilot signal may be training signal.

The UE 720 transmits packet $\theta_1$ over a block fading channel to the BS 710 at operation S705.

The BS 710 decodes the packet $\theta_1$, and finds that it is in error at operation S710.

When the it is in error, the BS 710 requests retransmission of the packet by sending NACK signal to the UE 710 at operation S715. In additional the BS also sends its channel output back to the UE 720.

The UE 720 transmits a Pilot signal to a BS 710 at operation S720. The BS 710 learns about the channel using the transmitted Pilot signal. Pilot signal may be training signal.

The UE 720 prepares a variation of the original packet for transmission using channel output feedback and also trains the BS about the next block fading coefficient at operation S725.

The UE 720 retransmits the variation of packet $\theta_1$ at operation S730.

The BS receives and decodes the variation of packet $\theta_1$ at operation S735.

When the variation of packet $\theta_1$ is successfully decoded, the BS 710 sends an ACK to the UE 720 at operation S740.

The UE 720 transmits a Pilot signal to a BS 710 at operation S745. The BS 710 learns about the channel using the transmitted Pilot signal. Pilot signal may be a training signal.

The UE 720 transmits packet $\theta_2$ over a block fading channel to the BS 710 at operation S750.

The BS 710 decodes the packet $\theta_2$, and finds that it is in error at operation S755.

The BS 710 and the UE 720 now repeats the steps described above.

The following description is directed to the generation of the variation of packet $\theta_1$ using COF.

With channel output feedback, even very simple linear schemes can be capacity achieving. Furthermore, these schemes can provide very high reliability. In other words, with channel output feedback, one can achieve a much lower error probability than is possible with just CSI feedback. To illustrate the point, a very simple linear coding scheme is derived for N retransmissions. In a case of hybrid-ARQ this is typically in the range of 3-5.

Figure 8:
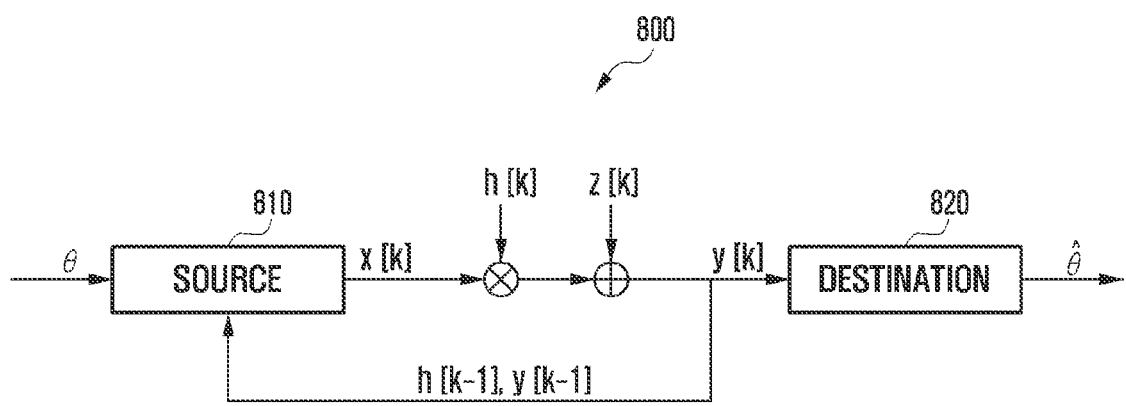
FIG. 8 is a diagram illustrating a mechanism for hybrid-Automatic Repeat Request (ARQ) system with channel output feedback according to an embodiment of the present disclosure.

FIG. 8 is a diagram illustrating a mechanism for a hybrid-ARQ system with channel output feedback according to an embodiment of the present disclosure.

Referring to FIG. 8, a hybrid-ARQ system 800 includes a source 810 and a destination 820. The source 810 and the destination 820 each may be UE 720 and BS 710 of FIG. 7.

By linear coding it is meant that the signal transmitted at transmission time interval k, x[k] is a linear combination of the original message $\theta$ and the side information $\{y[l]\}_{l=1}^{k-1}$ or $$x[k] = g_k\theta + \sum_{l=1}^{k-1} f_{k,l}z[l],$$

where $\theta$ has only one symbol (easily extendable to packet having L symbols) with $E[\theta^2]=1$. Collecting all the N retransmissions in a single vector, the overall scheme can be represented as $x=g\theta+Fz$, where $g \in R^{N \times 1}$, and $F \in R^{N \times N}$, is a strictly lower triangular matrix to enforce causality. Note that it is quite possible that the vector g and F may be a function of the channel realizations $\{h[l]\}_{l=1}^{N}$.

It is assumed that $E[\theta^2]=1$. Furthermore, the signal received at the destination Base Station (BS) is given by Equation (22) below.

$$y = Dx+z = Dg\theta+(I+DF)z, \quad \text{Equation (22)}$$

where $D=\text{diag}(h1, :::, hN)$. Without any Loss of Generality (WLOG) it is assumed that Dg is as Equation (23) below.

$$Dg = (I+DF)q. \quad \text{Equation (23)}$$

where $q \in R^{N \times 1}$. Note that $\det(I+DF)=1$; implying that the matrix I+DF is full rank. Substituting the Equation (23) in the Equation (22), it is established that the received Signal-to-Noise Ratio (SNR) at the destination is given by SNR=kqk2. Also, the power required at the source 810 is now given by Equation (24) below.

$$E[x^T x] = \|g\|^2 + tr(FF^T) \quad \text{Equation (24)}$$
$$= \|(D^{-1}+F)q\|^2 + \|F\|_F^2.$$

Now letting $fi=[fi;1; fi;2, :::, fi;i-1]^T$ and $ui=[q1, q2, :::, qi]^T$, the power constraint can be written as Equation (25) below.

$$E[x^T x] = \sum_{k=1}^{N} E[x^2[k]] \quad \text{Equation (25)}$$
$$= \sum_{i=1}^{N} \left(\left(\frac{q_i}{h_i} + f_i^T u_{i-1}\right)^2 + f_i^T f_i\right).$$

The optimization problem can now be set up as Equation (26) below where it is desired to minimize the total power required at the source 810 for a given target SNR(=').

$$\min_{q,F} \sum_{i=1}^{N} \left(\left(\frac{q_i}{h_i} + f_i^T u_{i-1}\right)^2 + f_i^T f_i\right) \quad \text{Equation (26)}$$
$$\text{s.t.} \quad \|q\|^2 = \eta.$$

It can be observed that the above optimization is simply quadratic in fi and therefore can be minimized by simply setting the derivative to zero. In other words, fi is as Equation (27) below.

$$f_i = -\frac{q_i}{h_i} \frac{1}{1+\|u_{i-1}\|^2} u_{i-1}. \quad \text{Equation (27)}$$

Plugging the value of the Equation (27) into the Equation (26), Equation (28) is provided below.

$$E[x^T x] = \sum_{i=1}^{N} \frac{q_i^2}{h_i^2} \frac{1}{1+\|u_{i-1}\|^2}. \quad \text{Equation (28)}$$

Now, let the power required at each time interval i be denoted by Pi, i.e., Equation (29) below.

$$P_i = \frac{q_i^2}{h_i^2} \frac{1}{1+\|u_{i-1}\|^2}. \quad \text{Equation (29)}$$

Clearly, there is provided Equation (30) below.

$$1+P_i h_i^2 = 1 + \frac{q_i^2}{1+\|u_{i-1}\|^2} \quad \text{Equation (30)}$$
$$= \frac{1+\|u_i\|^2}{1+\|u_{i-1}\|^2}.$$

Using the idea of telescopic series it is easy to show that, can be written as Equation (31) below.

$$\prod_{i=1}^{N}(1+P_i h_i^2)=1+\|q\|^2. \quad \text{Equation (31)}$$

Therefore the original optimization problem in the Equation (26) simplifies to Equation (32) below.

$$\min_{\{P_i\}_{i=1}^{N}} \sum_{i=1}^{N} P_i \quad \text{Equation (32)}$$
$$\text{s.t.} \prod_{i=1}^{N}(1+P_i h_i^2)=1+\eta,$$
$$P_i \geq 0.$$

The above optimization occurs frequently in the wireless communication setting. To make it more explicit, the above optimization problem can be rewritten as Equation (33) below.

$$\max_{\{P_i\}_{i=1}^{N}} \sum_{i=1}^{N} \log(1+P_i h_i^2) \quad \text{Equation (33)}$$
$$\text{s.t.} \sum_{i=1}^{N} P_i \leq NP,$$
$$P_i \geq 0.$$

The optimization in Equation (33) is a classic water filling problem in information theory. If the fading coefficient hi are independent from one channel realization to the other and no information about the channel statistics are known, then the best strategy is to allocate equal power across all transmissions, i.e., Pi=P for every instant i.

The following description is directed to Optimal Coding. Using back substitution, it can be shown that the optimal transmission scheme in this case consists of Equation (34) below.

$$x[k] = \frac{1}{\sqrt{1+Ph^2[k-1]}}(x[k-1]-Ph[k-1]z[k-1]), \quad \text{Equation (34)}$$

with x[1]=θ: Similarly, the receiver design is given by Equation (35) below.

$$\hat{\theta}[k] = \hat{\theta}[k-1] + \left(\prod_{l=1}^{k-1} \frac{1}{\sqrt{1+Ph^2[l]}}\right) \frac{Ph[k]}{1+Ph^2[k]} y[k], \quad \text{Equation (35)}$$

with $\hat{\theta}[0]$=0: Taking the analysis further, it can be shown that the probability of error for the above scheme decays doubly exponentially with the increase in the number of retransmissions N.

For the sake of simplicity, the development is shown for the case when the packet $\theta_1$ has only one symbol. However the method is exactly the same if the packet has more than one symbol. In that case, each symbol of the packet is independently coded using COF.

Figure 9:
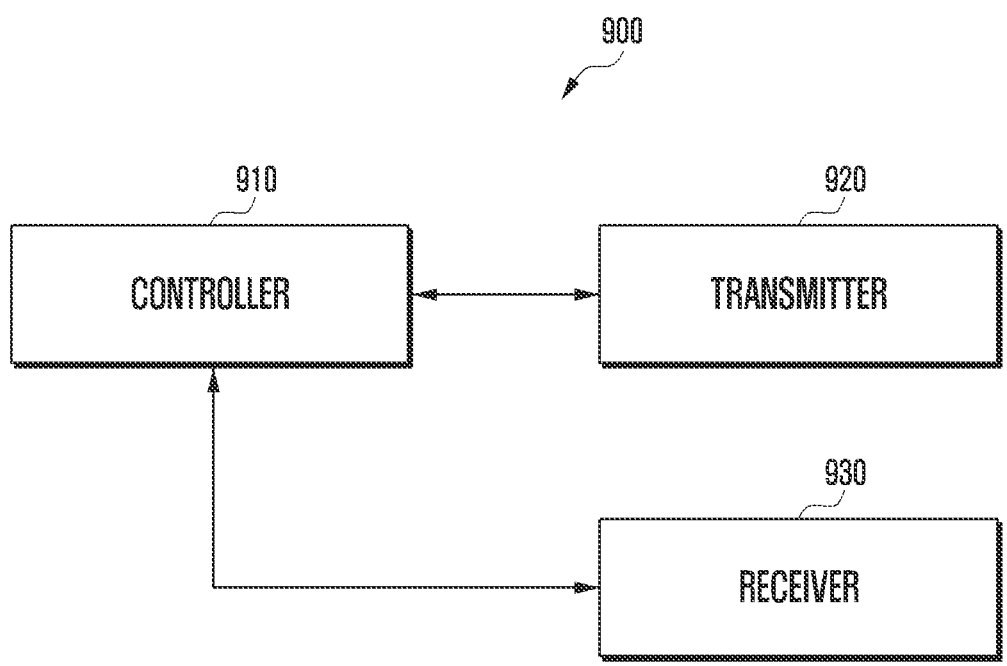
FIG. 9 is a block diagram showing another example of the configuration of a terminal for transmitting a signal using a channel output feedback according to an embodiment of the present disclosure.

FIG. 9 is a block diagram showing another example of the configuration of a terminal for transmitting a signal using a channel output feedback according to an embodiment of the present disclosure.

Referring to FIG. 9, a terminal 900 includes a controller 910, transmitter 920 and a receiver 930. The terminal 900 may be the UE 720 of FIG. 7 and the source 810 of FIG. 8.

The transmitter 920 transmits a pilot signal to a base station. Then, the transmitter 920 transmits a first packet to the base station.

The receiver 930 receives, from the base station, a NACK signal or an ACK signal from the base station. In additional, the receiver 930 receives a COF of the first packet from the base station.

The controller 910 prepares a variant of the second packet using the COF upon receiving the NACK signal. Then, the controller 910 controls to transmit the prepared variant to the base station.

The controller 910 controls to transmit a second packet to the base station upon receiving the ACK.

Figure 10:
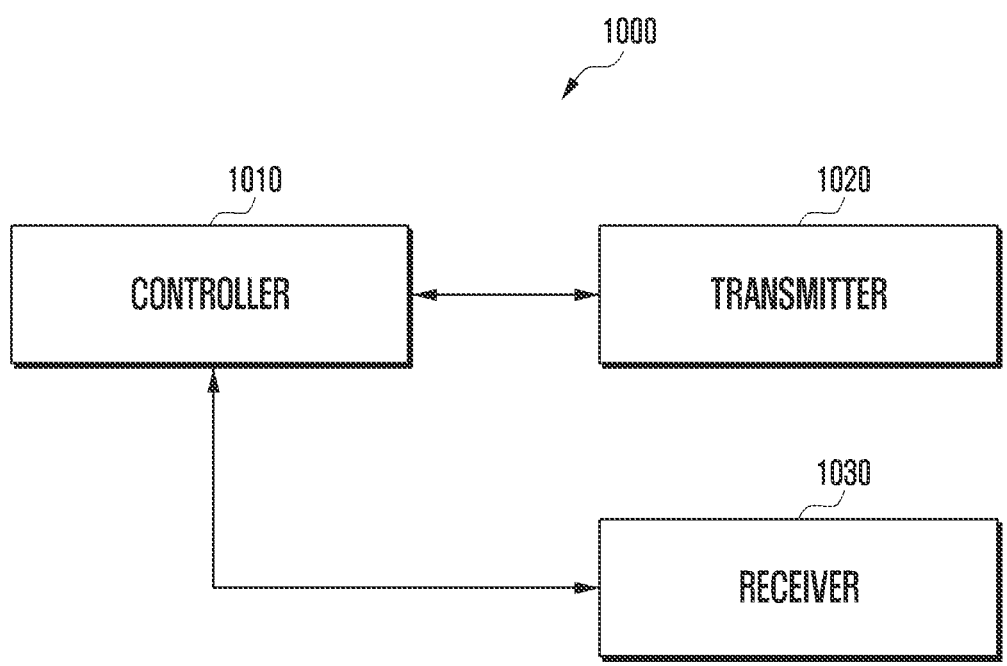
FIG. 10 is a block diagram showing another example of the configuration of a base station for transmitting a signal using a channel output feedback according to an embodiment of the present disclosure.

FIG. 10 is a block diagram showing another example of the configuration of a base station for transmitting a signal using a channel output feedback according to an embodiment of the present disclosure.

Referring to FIG. 10, a base station 1000 includes a controller 1010, transmitter 1020 and a receiver 1030. The base station 1000 may be the BS 710 of FIG. 7 and the destination 820 of FIG. 8.

The receiver 1030 receives a Pilot signal and a first packet from a terminal.

The controller 1010 learns about the channel using the transmitted Pilot signal. The controller 1010 decodes the received first packet, and finds that it is in error. When the it is in error, the controller 1010 requests retransmission of the packet by sending NACK signal to the terminal. In additional the controller 1010 also controls to send its channel output back to the terminal.

When the first packet is successfully decoded, the transmitter 1020 sends an ACK to the terminal.

The present disclosure provides the incorporation of channel output feedback to the K user interference channel. It is demonstrated through simulations, that even with two-time step process, huge improvements in the interference alignment can be achieved. Finally, also suggested are some of the scenarios, in which our proposed methodology might be useful.

As described above, a method and apparatus for transmitting and receiving a signal using a channel output feedback of the present disclosure is capable of transmitting/receiving a signal in a wireless system with reducing interference.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to embodiments of the present disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Units (CPUs) in a device or a secure multimedia card.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal for transmitting a signal using a channel output feedback, the terminal comprising:
   a transmitter configured to transmit, to a base station, a first packet being applied a precoder received from the base station;
   a receiver configured to receive, from the base station, a Channel Output Feedback (COF) of the transmitted first packet and information for transmitting a second packet, wherein the information for transmitting the second packet is information on a channel state between the terminal and the base station determined based on a channel output of the transmitted first packet; and
   a controller configured to prepare a variant of the second packet using the COF and the received information for transmitting the second packet, and to control to transmit the prepared variant to the base station,
   wherein the COF of the transmitted first packet is a received signal of first packet received by the base station.

2. The terminal of claim 1, wherein the information for transmitting the second packet includes at least one of information for a first precoder of a signal transmitted over a current time, information for a second precoder of a signal transmitted over a previous time, a first scalar coefficient for the first precoder and a second scalar coefficient for the second precoder.

3. The terminal of claim 1, wherein the COF is transmitted via one of a Physical Downlink Shared Channel (PDSCH) and a Physical Downlink Control Channel (PDCCH).

4. The method of claim 1, wherein the transmitter is configured to transmit a pilot signal to the base station, wherein the precoder is selected based on the transmitted pilot signal.

5. A method for transmitting a signal using a channel output feedback in a terminal, the method comprising:
   receiving information for a precoder from the base station;
   transmitting a first packet being applied the received precoder to the base station;
   receiving a Channel Output Feedback (COF) of the transmitted first packet from the base station;
   receiving information for transmitting a second packet from the base station, wherein the information for transmitting the second packet is information on a channel state between the terminal and the base station determined based on a channel output of the transmitted first packet;
   preparing a variant of the second packet using the COF and the received information for transmitting the second packet; and
   transmitting the prepared variant to the base station,
   wherein the COF of the transmitted first packet is a received signal of first packet received by the base station.

6. The method of claim 5, wherein the information for transmitting the second packet includes at least one of information for a first precoder of a signal transmitted over a current time, information for a second precoder of a signal transmitted over a previous time, a first scalar coefficient for the first precoder and a second scalar coefficient for the second precoder.

7. The method of claim 5, wherein the COF is transmitted via one of a Physical Downlink Shared Channel (PDSCH) and a Physical Downlink Control Channel (PDCCH).

8. The method of claim 5, further comprising:
   transmitting a pilot signal to the base station,
   wherein the precoder is selected based on the transmitted pilot signal.

9. A base station for receiving a signal using a channel output feedback, the base station comprising:
   a transmitter configured to transmit, to a terminal, information for a precoder;
   a receiver configured to receive, from the terminal, a first packet being applied on the transmitted precoder; and
   a controller configured to control to feed back a channel output of the received first packet, to determine information for transmitting a second packet which is information on a channel state between the terminal and the base station based on the channel output, to control to transmit the determined information for transmitting a second packet to the terminal, and to control to receive a second packet from the terminal, wherein the second packet is a variant of an original signal prepared using the COF and the transmitted information for transmitting the second packet,
   wherein the COF of the transmitted first packet is a received signal of first packet received by the base station.

10. The base station of claim 9, wherein the receiver receives information for another base station from the other base station and the information for transmitting the second packet is determined based on further the received information for the other base station.

11. The base station of claim 9, wherein the receiver is configured to receive a first pilot signal from the terminal and a second pilot signal from another terminal,
wherein the transmitter is configured to transmit information for the base station to other base station, and
wherein the information for the base station is trained based on the first and second pilot signal.

12. The base station of claim 9, wherein the receiver receives a first pilot signal from the terminal and a second pilot signal from another terminal, wherein the precoder is selected based on the first and second pilot signal.

13. The base station of claim 9, wherein the information for transmitting the second packet includes at least one of information for a first precoder of a signal transmitted over a current time, information for a second precoder of a signal transmitted over a previous time, a first scalar coefficient for the first precoder and a second scalar coefficient for the second precoder.

14. The base station of claim 9, wherein the COF is transmitted via one of a Physical Downlink Shared Channel (PDSCH) and a Physical Downlink Control Channel (PDCCH).

15. A method for receiving a signal using a channel output feedback in a base station, the method comprising:
transmitting information for a precoder to a terminal;
receiving a first packet being applied on the transmitted precoder from the terminal;
feeding back a channel output of the received first packet to the terminal;
determining information for transmitting a second packet which is information on a channel state between the terminal and the base station based on the channel output;
transmitting the determined information for transmitting a second packet to the terminal; and
receiving a second packet from the terminal, wherein the second packet is a variant of an original signal prepared using the COF and the transmitted information for transmitting the second packet,
wherein the COF of the transmitted first packet is a received signal of first packet received by the base station.

16. The method of claim 15, further comprising:
receiving information for another base station from the other base station,
wherein the information for transmitting the second packet is determined based on further the received information for the other base station.

17. The method of claim 15, further comprising:
receiving a first pilot signal from the terminal;
receiving a second pilot signal from another terminal; and
transmitting information for the base station to other base station,
wherein the information for the base station is trained based on the first and second pilot signal.

18. The method of claim 15, further comprising:
receiving a first pilot signal from the terminal; and
receiving a second pilot signal from another terminal,
wherein the precoder is selected based on the first and second pilot signal.

19. The method of claim 15, wherein the information for transmitting the second packet includes at least one of information for a first precoder of a signal transmitted over a current time, information for a second precoder of a signal transmitted over a previous time, a first scalar coefficient for the first precoder and a second scalar coefficient for the second precoder.

20. The method of claim 15, wherein the COF is transmitted via one of a Physical Downlink Shared Channel (PDSCH) and a Physical Downlink Control Channel (PDCCH).

* * * * *